United States Patent [19]

Hlavaty et al.

[11] Patent Number: 5,086,586
[45] Date of Patent: Feb. 11, 1992

[54] VEHICLE SIDE DOOR FLUSH GLASS SYSTEM

[75] Inventors: David G. Hlavaty, Allen Park; Juozas Doveinis, Sterling Heights; Bela Gergoe, Birmingham, all of Mich.

[73] Assignee: General Motors Corporation, Detroit, Mich.

[21] Appl. No.: 689,438

[22] Filed: Apr. 23, 1991

[51] Int. Cl.$^5$ .............................................. E05F 11/52
[52] U.S. Cl. ........................................ 49/211; 49/376; 49/377; 49/351; 49/441
[58] Field of Search .................. 49/211, 212, 213, 374, 49/375, 376, 377, 348, 350, 351, 441

[56] References Cited

U.S. PATENT DOCUMENTS

| | | |
|---|---|---|
| 1,501,453 | 7/1924 | Humer ............................. 49/211 X |
| 2,024,773 | 12/1935 | Lohrman ............................. 296/48 |
| 2,979,327 | 4/1961 | Swanson et al . .................. 268/124 |
| 4,561,211 | 12/1985 | Raley et al. ............................. 49/374 |
| 4,575,967 | 3/1986 | Bickerstaff ............................. 49/211 |
| 4,656,784 | 4/1987 | Brachmann ....................... 49/374 X |
| 4,667,442 | 5/1987 | Hiramatsu et al . ............... 49/374 X |
| 4,694,611 | 9/1987 | Okumura ......................... 49/374 X |
| 4,771,575 | 9/1988 | Tiesler ................................. 49/211 |
| 4,788,794 | 12/1988 | Miller ............................... 49/211 X |
| 4,800,681 | 1/1989 | Skillen et al. ..................... 49/441 X |

FOREIGN PATENT DOCUMENTS 2435766  2/1976  Fed. Rep. of Germany .

*Primary Examiner*—Philip C. Kannan
*Attorney, Agent, or Firm*—William A. Schuetz

[57] ABSTRACT

A vehicle door assembly has a framed door and a window which is movable between open and closed positions. The window is biased outwardly toward an outer flange on the framed door by a first seal and is guided via pin guides secured to its side lower end by guide channels which include outwardly curved upper guide track sections which are supported for limited movement relative to the stationary lower guide tracks. The upper curved guide track sections are movable by the pin guides as the window approaches its closed position so the window will be substantiallly flush on all four sides with the door frame and outer door panel and thus this flushness is achieved irrespective of the tolerance variatons in the height of the frame and window.

8 Claims, 3 Drawing Sheets

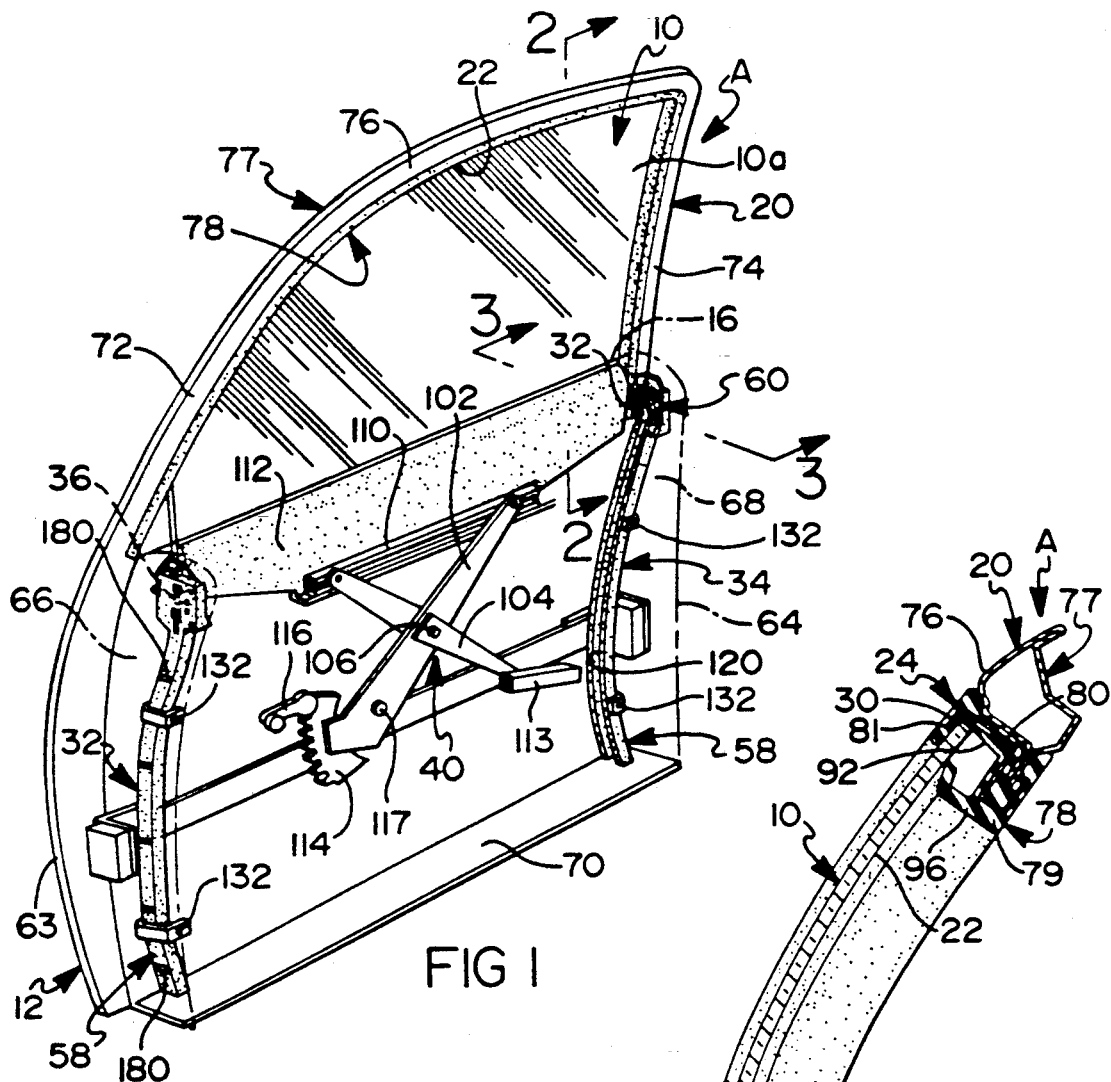
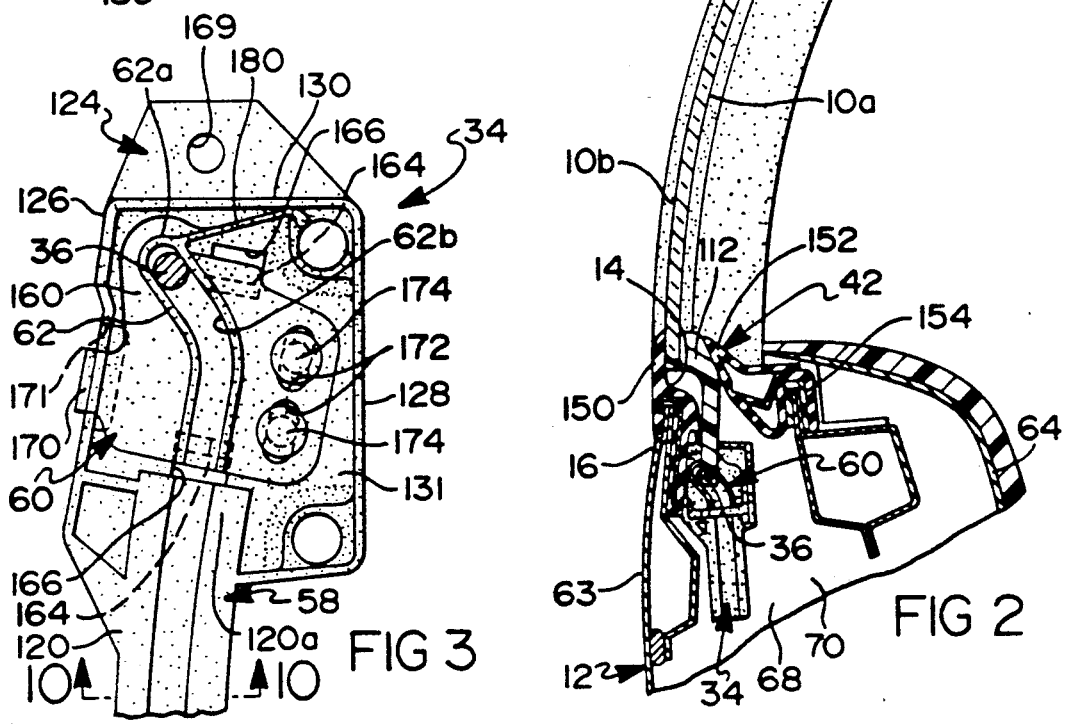

VEHICLE SIDE DOOR FLUSH GLASS SYSTEM

The present invention relates to a frame vehicle door assembly and, more particularly, to a framed vehicle door assembly having a movable window which is moved laterally outwardly so as to be substantially flush with the frame and door on all four exterior sides of the window when in its closed position.

Heretofore, vehicle door assemblies have been provided in which a movable door window carried by the door assembly is substantially flush with the door or outer body structure of the vehicle along all four sides of the vehicle when in its closed position. Examples of such flush glass systems for a vehicle door are shown in U.S. Pat. No. 2,979,327, assigned to the same assignee as the present invention, U.S. Pat. No. 4,575,967; U.S. Pat. No. 4,561,211, assigned to the same assignee as the present invention and German Pat. No. 24 35 766. U.S. Pat. No. 2,979,327 shows a flush glass system in which the glass is guided for movement between its open and closed positions by a pivotal roller guide track arrangement which includes outwardly offset portions. The offset portions of the track cause the roller guides to pivot to cause the window to be moved laterally outwardly as it approaches its closed position to position the lower part of the window so as to be substantially flush with the exterior panel of the vehicle door, in which position it is also substantially flush with the roof of the vehicle. U.S. Pat. No. 4,575,967 shows a similar type arrangement in which a guide track for the window includes outwardly directed fixed sections for causing the window as it approaches its closed position to be moved outwardly so as to be substantially flush with the exterior panel of the vehicle door and to be substantially flush along its top and sides with the door or vehicle body. U.S. Pat. No. 4,561,211 shows a track and a window having tapered side guides which cause the window to be moved outwardly so as to be substantially flush with the exterior panel of the vehicle door and to be substantially flush with the vehicle door frame. The German patent No. 24 35 766 shows a roller guide and guide track arrangement including a fixed outwardly extending portion for causing the window to be moved outwardly so as to be flush with the adjacent frame of the door when in its closed position.

However, in order to achieve substantial flushness in the above-noted arrangements, it is necessary that the vertical build tolerance variations, i.e., door frame, glass and belt line height, of the various parts thereof must be closely maintained. This is a difficult objective to achieve when high volume production of vehicle door assemblies is contemplated.

In accordance with the provisions of the present invention, a vehicle door assembly is disclosed having a substantially flush glass system which achieves substantial flushness of the movable window, when in its closed position, with the adjacent door frame and exterior panel of the door at its belt line irrespective of the vertical tolerance build variations of various parts of the door system, such as, the glass height, the height of the door frame, the height of the lower body structure of the door and the dimensions of the various seals which are necessary to seal against the glass when the glass is in its closed position in order to prevent window noise and water leakage.

This is achieved, in accordance with the provisions of the present invention, by providing plastic guide channel means comprising an elongated stationary portion and a curved upper portion which extends outwardly toward the outer door panel at its belt line. The guide channel means receive pin guides secured to the adjacent lower sides of the glass. The curved upper portion is supported for limited movement relative to the lower stationary channel portions. This limited movement allows the pin guides as they enter the curved sections to be fully moved outwardly toward the exterior panel of the door assembly due to the fact that the curved sections can move relative to the stationary sections. This movement can either be linear in that the curved section will move upwardly relative to the stationary section or could be pivotal so as to be pivotal outwardly relative to the lower channel portions.

Another feature of the present invention resides in the fact that the upper door frame has a channel of sufficient width to allow the window to be moved laterally thereof and carries seal means which engages the interior surface of the window to bias the window outwardly against an outer flange of the frame so as to be substantially flush therewith. Since the window is engaged along its interior sides by the seal means while being guided for movement in the upper door frame, there is no need for pin guides to be located above the belt line so that the only pin guide means needed for guiding the movement of the window toward and from the outer-door panel are the pin guides received in the guide channel means.

The present invention further resides in various novel constructions and arrangement of parts, and further features, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 1 is a perspective view, with portions shown in phantom, of the novel door assembly of the present invention.

FIG. 2 is an enlarged sectional view taken approximately along lines 2—2 of FIG. 1;

FIG. 3 is a fragmentary section view taken approximately along lines 3—3 of FIG. 1;

Figure 11:
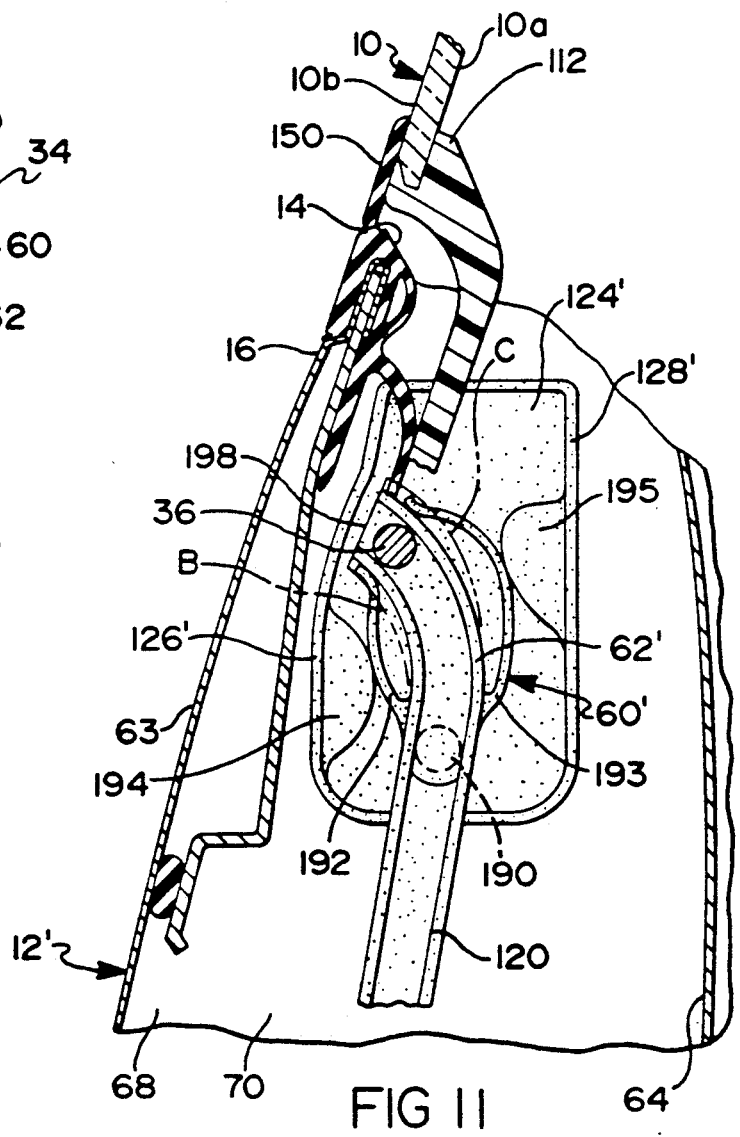
Figure 8:
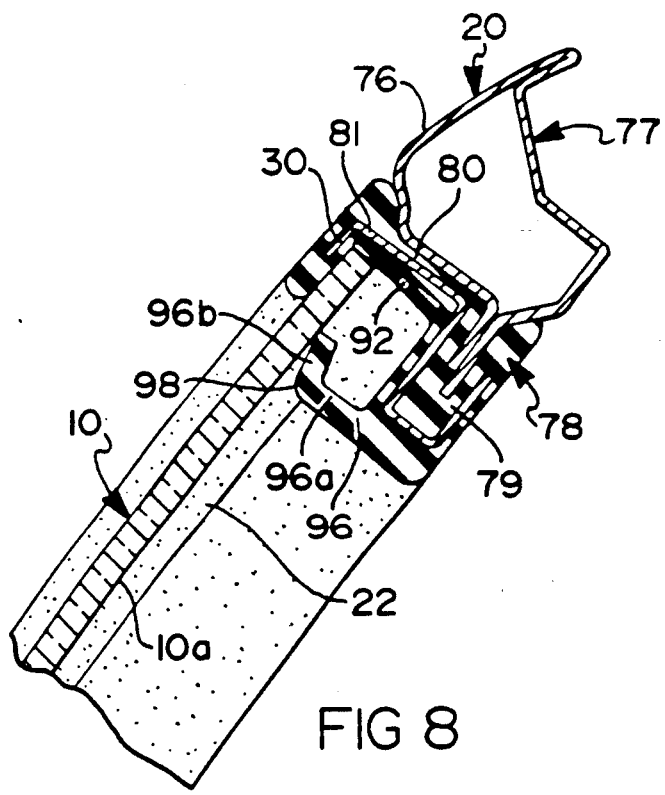
Figure 10:
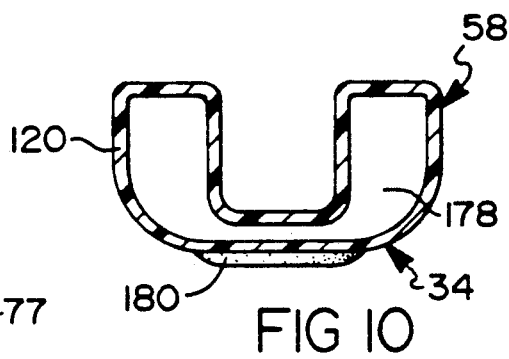
Figure 9:
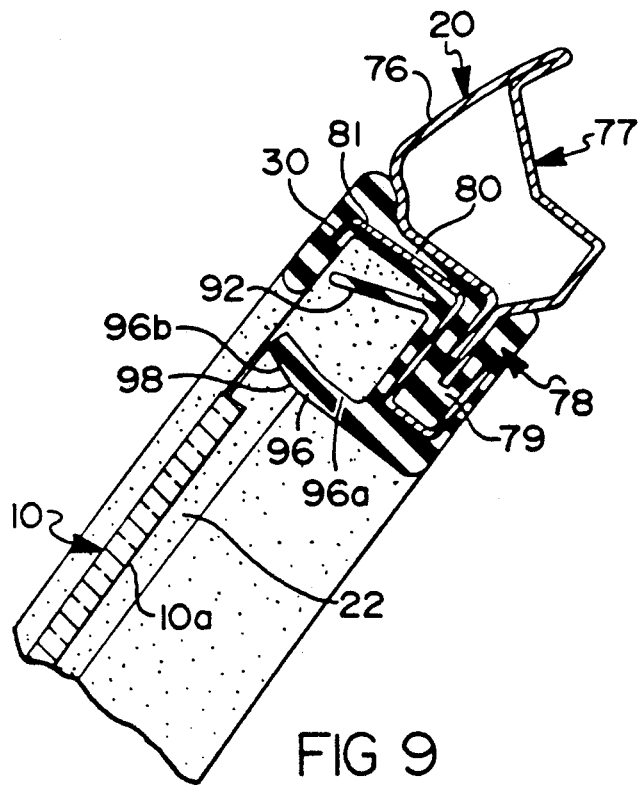

FIGS. 4-7 perspective views of part of the guide channel means shown in FIG. 3 and showing different parts t in different positions;

FIG. 8 is an enlarged fragmentary sectional view of part of the door assembly shown in FIG. 2;

FIG. 9 is an enlarged fragmentary sectional view like that shown in FIG. 8, but showing different parts thereof in different positions;

FIG. 10 is an enlarged sectional view taken approximately line 10—10 of FIG. 3; and FIG. 11 is a fragmentary sectional view of an alternate embodiment of the novel door assembly of the present invention.

The present invention provides a novel framed vehicle door assembly A having a movable window 10 which is substantially flush with the door assembly on all four exterior sides of the window when in its closed position.

Referring to FIGS. 1 and 2 of the drawings, the novel door assembly A comprises, in general, a lower door body structure 12 having a top opening 14 extending longitudinally of the door assembly at its belt line 16, an upper door frame 20 which defines with the lower door body structure 12 a window opening 22, first seal means 24 carried by the frame 20 which is sealingly engageable with the window 10 along its side and top edge portions on its interior surface 10a and which biases the window 10 outwardly toward engagement with an exterior flange 30 of the door frame 20, a pair of spaced guide channel means 32, 34 supported by the lower body door structure, a pair of guides 36 secured to the window at its opposite sides adjacent its lower end and which are slidably received within the guide channel means 32, 34, a window regulator means 40 carried by the lower body structure 12 for effecting movement of the window 10 between its open and closed positions, and second seal means 42 carried by the lower body structure 12 adjacent the belt line for engagement with the window 10 when in its closed position. The guide channel means 32, 34 each include stationary lower guide track sections 58 and upper sections 60 having curved guide channels or tracks 62 which are slidably supported for limited movement relative to the stationary sections 58. As the window 10 approaches its closed positions, the upper sections 60 guide the movement of the window 10 outwardly so that it will be substantially flush with the outer flange 30 of the frame and be substantially flush with an outer panel 63 of the lower door structure 12 at its belt line 16 when in its closed position. As more fully explained hereafter, this flush positioning is achieved irrespective of the tolerance variations in the height of the window 10, door frame 20 or lower body structure 12 of the door assembly A, the position of the guide channel means 32, 34 and the dimensions of the various seal means 24, 42.

The lower door body structure 12 of the door assembly A comprises the outer panel 63, a spaced inner panel 64 and spaced end walls 66, 68 which together define an interior compartment 70. The interior compartment 70 has a top opening 14 at the belt line or top end 16 of the lower door structure 12 through which the window 10 can pass.

The upper door frame 20 is of a generally inverted U-shaped configuration, as viewed in side elevation, in FIG. 1, and comprises fore and aft sides 72, 74, respectively, and a top 76. As best shown in FIGS. 2, 8 and 9, the upper frame 20 has a hollow outer portion 77 and a generally inverted U-shaped inner portion 78, as viewed in cross section, throughout its extent to define spaced outer and inner flanges 30, 79, respectively, and a bottom 80. The upper frame 20 forms a continuation with the lower door body structure 12 adjacent the end walls 66, 68 of the latter.

The inner portion 78 of the frame 20 is bonded or otherwise secured thereto to the outer portion 77. The inner portion 78 is made from a suitable elastomeric or plastic material and has a generally U-shaped metal reinforcement member 81 embedded therein so that the outer flange 30, inner flange 79 and the bottom are substantially rigid. The seal means 24 is integral with the flange 79 throughout its extent. The seal means 24 comprises a pair of spaced deflectable seals 92 and 96 extending laterally inwardly from the outer flange 79. The seal 92 is planar and is located adjacent to, but spaced from, the bottom 80 of the inner frame portion 78. The seal 92 is supported cantilever fashion and is self-biased toward a position located inwardly of the side edges of the window 10 and inwardly of the top edge of the window 10, when the latter is in its closed position. The seal 92 thus engages the side edges and top edge of the window to provide a peripheral seal when the window 10 is in its closed position. The deflectable seal 96 extends laterally toward the flange 30 and has a first section 96a pivotal about the inner end of the flange 79 and a second section 96b pivotal relative to the section 96a about pivot line 98. The section 96b engages the window 10 along its interior sides and adjacent its top edge. The seal 96 thus engages the interior side 10a of the window 10 at a location spaced slightly inwardly from its side and top edges when the window 10 is in its closed position. The seal 96 biases the window 10 outwardly and into engagement with the interior facing side of the flange 30. The seals 92, 96 also function to seal the window 10 against wind noise and water leakage.

In the preferred embodiment, the width of the U-shaped inner frame portion 78 between its inner and outer flanges 30, 79 is such that it will accommodate lateral movement of the window 10 therebetween. Alternately, the inner frame portion 78 could be made so that it is tapered along its side portions 74, 72 so that it would be wider adjacent its lower end and then its top end so as to accommodate lateral movement of the window 10.

The window 10 is supported in the vertical position to which it is moved by the inner panel 64 of the lower body structure 12 via the window regulator mechanism 40. The window regulator mechanism 40 could be of any suitable or conventional construction and is hereshown as being a cross arm window regulator mechanism. As is well known in the art, the cross arm window regulator mechanism comprises a pair of planar cross arms 102, 104 which are pivotally interconnected intermediate their ends by a pivot pin means 106. The arms 102, 104 at one of their ends would be slidably connected via a roller (not shown) to a guide channel 110 secured to a lower support 112 bonded or otherwise secured to the lower end of the window 10. The arms 102, 104 are of a thickness such that they can flex laterally of their plane toward and from the outer door panel 63 a limited amount, and for a reason to be hereinafter more fully described. The arm 104 at its opposite end would be slidably connected via a roller (not shown) to a guide channel 113 secured to the inner panel 64 of the lower door structure 12. The arm 102 at its other end would be connected to a sector gear 114 which is in meshed engagement with a pinion (not shown) which in turn is suitably connected to a handle 116 rotatably supported by the inner door panel 64 and disposed interiorly of the vehicle. The arm 102 is also pivotally connected to the inner panel 64 of the lower door structure 12 via a pivot means 117. The support 112 is preferably made from a plastic material bonded to the glass at its lower end and also serves as the support for a pair of pin guides 36 at its opposite ends which extend laterally of the window 10. The pin guides 36 would preferably be metal and be suitably secured to the lower support 112.

The pin guides 36 are slidably received within the guide channel means 32, 34. The guide channel means 32, 34 are of identical construction and hence, only the guide channel means 34 will be described in detail. The guide channel means 34 is made from a suitable plastic material and comprises the lower stationary section 58 which defines a slightly curved lower stationary guide track 120 which is integral with a housing 124 at its upper end. As best shown in FIG. 3, the housing 124 comprises left and right spaced side walls 126, 128, top wall 130 and a planar bottom 131. The guide channel means 34 is secured to the inner panel 64 of the lower body structure of the door 12 via brackets 132 which are suitably bolted or otherwise secured to the inner door panel 64. It is also secured at its upper end via a fastener (not shown) to the end wall 68. The fastener would extend through opening 169 in the housing 124 and be secured to the end wall 68. The guide channel means 34 is formed by a gas injected molding process so that it has a U-shaped void 178 (see FIG. 10) and longitudinally spaced laterally extending ribs 180 on its exterior bottom side (see FIG. 1). This molding technique for making the channel 34 reduces its weight due to the voids 178 and at the same time makes it warp resistant and allows for accurate molding. The guide channel means 34 also includes the upper sections 60 in the form of an upwardly and outwardly curved guide channel 62 for guiding the movement of the adjacent pin guide 36 as the window approaches its closed position, and in a manner to be hereinafter more fully described.

The door assembly A also includes the lower seal means 42 in the form of a deflectable thin elastomeric flipper seal 150 for engaging the exterior side 10b of the window 10 when it is moved to its closed position. It also includes a deflectable interior seal 152 for engaging the inner side 10a of the window 10. The seal 152 is carried by a suitable flange 154 on the lower door body structure. Thus the window 10 is engaged both exteriorly and interiorly with seal means 42, 152 when in its closed position, as shown in FIG. 2.

In operation, and when the window 10 is in its closed position, the pin guide 36 will be in the position shown in FIG. 3. When the operator desires to open the window 10, he will rotate the handle 116 in the appropriate direction to cause the cross arms 102, 104 of the window regulator mechanism 40 to move the window downwardly into the compartment 70 of the lower door structure 12. As this occurs, the lower end of the window will be moved inwardly and follow the path of the curved guide section 62. This inward movement of the window moves the lower support 112 inwardly and causes the window 10 to pivot about its top away from the planar outer flange 30. When the guide pins 36 reach the position shown in FIG. 4, they will enter the stationary guide tracks 120 and follow the path of movement of the stationary guide tracks 120.

Figure 4:
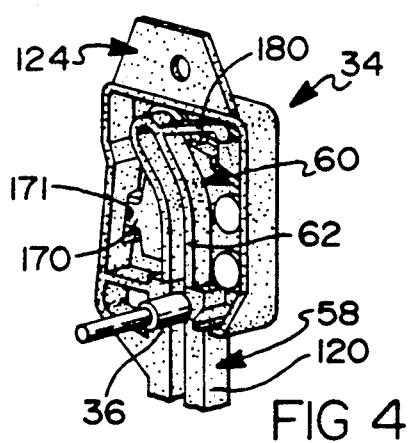
Figure 5:
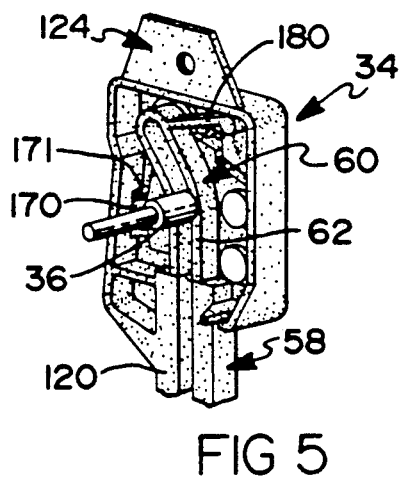
Figure 6:
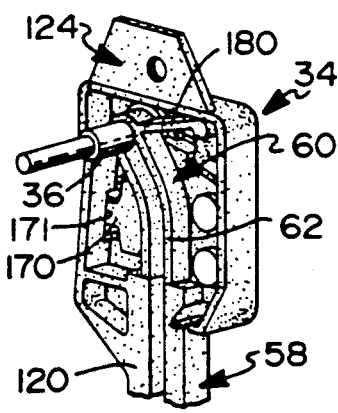

When the operator desires to raise the window 10 from an open position toward its closed position, as shown in FIG. 1, he will rotate the handle 116 of the window regulator mechanism 40 in the appropriate direction to cause the window 10 to be raised. Raising of the window causes the guide pins 36 to follow the guide tracks 120 until they reach the position shown in FIG. 4. Further movement causes the guide pins to enter the curved guide tracks 62, as shown in FIGS. 5 and 6. As the window 10 approaches its upper position, the lower end thereof will be moved outwardly toward the outer door panel 63 and engage the outer flipper seal 150. The window 10 is at all times guided at its side edges against the inside of the outer flange 30 due to the seal 96 exerting an outwardly directed biasing force. When the pin guides 36 are in the outermost position shown in FIGS. 4 or 7, the window 10 will be fully outboard position vis a vis the outer panel 63 and will be substantially flush with the outer panel 63 and the outer flange 30 of the frame 20.

In accordance with the provisions of the present invention, the upper sections 60 including the curved guide track portions 62 are supported for limited movement relative to the stationary guide track 120 so that the pin guides 36 can be moved fully outwardly to position the window 10 substantially flush vis a vis the door frame 20 and the outer door panel 63. In the preferred embodiment shown in FIG. 3, this is accomplished by forming the upper section 60 with a planar base 160 which is slidably supported on the bottom 131 of the housing 124. To this end, the planar base 160 has downwardly directed spaced tabs 164, as shown in FIG. 3, which are slidably received in rectangularly shaped openings 166 in the bottom 131 of the housing 124 and has an outwardly extending lateral tab 170 which is slidably received in a lateral opening 171 in the side wall 126 of the housing 124. The base 160 also has a pair of elongated oval slots 172 through which headed rivets 174 carried by the housing 124 extend. The base 160 is thus slidably supported so that the curved guide track 62 formed integral therewith can be linearly moved upwardly and downwardly along the path of movement of the stationary guide tracks 120 toward and from the upper ends 120a of the stationary guide tracks 120.

As best shown in FIG. 3, the curved guide tracks 62 initially guide the movement of the window upwardly and then, due to their curvature, guide the movement of the window both upwardly and outwardly. Also integrally formed with each curved guide track 62 is a integrally formed deflectable leaf spring 180 which is integral at its left end with the curved guide track 62 at its upper bight or end 62a and has its other curved end in sliding abutting engagement with the top wall 130 of the housing 124. The leaf spring 180 biases the upper section 60 so that it engages the upper end of the stationary track 120, as shown in FIGS. 4-6.

By providing a curved guide track 62 which has limited linear movement relative to the stationary guide track 120, fully outward positioning of the window 10 against the outer seal 150 so that it is substantially flush with the outer body panel 63 can be achieved irrespective of the body build variations in the height of the window 10, the height of the frame 20, and the height of the lower body structure 12.

This is achieved by positioning and mounting the guide channel means 32, 34 to the lower body structure 12 so that no linear movement of the upper sections 60 occurs when the window height is at its maximum dimension and the frame height, as measured from the belt line 16, is at its minimum dimension. If this condition exists, the pin guides 36, as shown in FIGS. 4-6, will merely ride in the curved guide channels 62 until the pin guides are slightly spaced from or engage the bight 62a thereof, as shown in FIG. 6. The outward movement of the pin guides 36 and window 10 can take place due to the fact that the arms 102, 104 of the window regulator mechanism 40 will flex sufficiently toward the outer door panel to permit the necessary outward movement. In this position, the lower end of the window will be in its FIG. 2 position in which it is substantially flush with the outer door panel, the upper edge of the window 10 will be engaged with the bottom 80 of the inner frame portion 78 through the seal 92 and the window 10 will be positioned against the outer flange 30 due to the biasing force of the seal 96.

Figure 7:
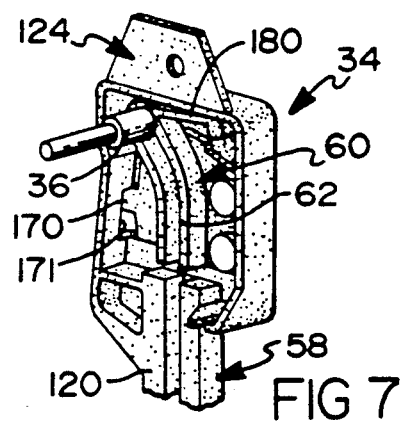

However, should the window 10 height be at its minimum dimension and the height of the frame 20 at its maximum dimension, the pin guides 36 upon entering the curved tracks 62 will engage the tracks 62 along the upper wall 62b of the latter. Since the top edge of the window 10 has not yet bottomed out against the seal 92 and bottom 80 it will continue to be moved upwardly by the cross arms 102, 104. This will cause the pin guides 36 to move the upper sections 60 linearly upwardly in opposition to the biasing force of the leaf springs 180. Note that the pin guides 36 will also be moving outwardly in the curved tracks 62. When the leaf springs 180 are fully deflected, as shown in FIG. 7, the pin guides 36 will be engaged with the bight 62a of the curved tracks 62 and the window 10 will be positioned so as to be substantially flush with the outer door panel 63 and the outer flange 30 of the inner door frame portion 78.

For any combination of window heights and frame heights between their maximum extremes, the operation of the upper sections 60 will be the same as just described, except that the upper sections will only be linearly moved the necessary extent to insure full outward movement of the pin guides 36 and window 10.

Note that the lower end of the window 10 and lower support 112 are always positioned against the seal 150, when the window is in its closed position, so that clearance is provided between the lower support 112 and the upper end of the outer door panel 63 at its belt line irrespective of the height of the outer panel 63 or lower body structure 12. Further, the angular position and height of the channel means 32, 34 vis a vis the lower body structure 12 can vary within normal tolerance variations, since the pin guides 36 are usually spaced slightly from the bight 62a when in their outermost position. They may actually engage the bight 62a when the curved sections are at their closest location vis a vis the outer door panel.

Additionally, it should be noted that the particular seal designs or configurations 24, 42 are such that they need not be made to very close tolerance limitations in order to achieve their sealing functions.

FIG. 11 shows an alternate embodiment of the present invention. This embodiment is identical to the previously described embodiment except that a different upper section 60' having a curved track 62' is employed. The curved track 62', instead of being supported for limited linear movement upwardly and downwardly from the stationary track 120, is supported for horizontal pivotal movement relative to the stationary guide track 120 via a pivot means 190. In this embodiment, the upper curved track 62' is allowed to pivot so as to enable the window 10 to be fully positioned in its substantially flush position. The other difference is that a pair of leaf springs 192, 193 having one end integral with the curved portion and the other end engageable with bosses 194, 195 respectively, carried by the side walls 126', 128' of the housing 124' are provided to bias the upper curved track 62' to a neutral central position, as shown by the solid lines in FIG. 11. The pivotal guide tracks 62' enable the window 10 to be moved to its outer substantially flush position irrespective of the tolerance variations in the height of the window and frame and in a manner which will be hereinafter described.

In the FIG. 11 embodiment, the solid line position shows the neutral position of the pivotal curved track 62'. If both the window height and the height of the frame 20 are at their nominal dimensions, i.e., midway between their maximum and minimum dimensions permitted by the tolerance variations from the nominal dimensions, the pin guides 36 will merely follow the curved tracks 62' without causing any pivotal movement of the tracks 62' until the window 10 is fully positioned flush against the outer flange 30 of the inner portion 78 of the frame 20. In this position the window will be substantially flush with the frame 20 and be substantially flush with the outer panel 63 of the lower body structure 12. Note that the pin guide 36 is located somewhat inwardly from the upper outermost edge 198 of the guide track 62' when the window 10 is in its closed position.

If the window 10 is at its maximum height and the frame is at its minimum height, the pin guides 36, when the top edge of the window bottoms against the seal 92 and bottom 80 of the inner frame portion 78, will cause the curved guide track 62' to pivot in a counterclockwise direction, as viewed in FIG. 11, in opposition to the biasing force of the lower spring 192 toward the phantom line position B. This allows the window to pivot about its top edge and be fully moved outwardly to its full substantially flush position. Note that the pin guide 36 would be located further inwardly from the top edge 198 when this condition exists then that shown by the solid line in FIG. 11. When the window 10 is thereafter lowered, the lower leaf spring 192 would return the guide track 62' to its neutral position.

If the window 10 is at its minimum height and the frame 20 at its maximum height, the pin guides 36 would engage the upper side of the guide track 62' and cause the latter to be pivoted clockwise, as viewed in FIG. 11, in opposition to the biasing force of the upper leaf spring 193 to the phantom line position C. This is because the top edge of the window 10 would not as yet have bottomed out against the seal 92 and bottom 80 of the frame. However, since the track 62' is curved the pin guides 36 would also move outwardly until the window 10 is substantially flush with the seal portion 150 and outer flange 30. Note that the pin guide 36 would be located closer to the top edge of the track 62' in this condition than that shown by the solid lines in FIG. 11. When the window 10 is thereafter lowered, the leaf spring 193 will return the guide track 62' to its neutral position.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A framed vehicle door assembly comprising a lower body structure having spaced inner and outer panels and a pair of spaced end walls which together define a compartment having a top opening extending longitudinally of the door assembly, an upper door frame having fore and aft side portions and a top portion which together with the lower body structure defines a window opening, said frame including a portion which is generally U-shaped in cross-section to define spaced inner and outer flanges, a window supported by the lower body structure for movement through the top opening between open and closed positions, first seal means carried by said portion of said frame and sealingly engageable with said window along its sides on its interior surface and biasing said window outwardly toward engagement with said exterior flange, spaced guide channel means including stationary guide tracks supported by said lower body structure and located within said compartment, a pair of guides secured to said window at its opposite sides and adjacent its lower end, said guides being slidably received within said guide channel means, window regulator means carried by said lower body structure for effecting movement of said window between its open and closed positions, second seal means carried by said lower body structure adjacent said top opening thereof for engagement with said window when in its closed position, and said guide channel means including second guide tracks for effecting outward movement of said window as it approaches its closed position so that said window will be substantially flush with said outer flange of said portion of said frame and be substantially flush with the outer panel of said lower door structure when in its closed position, the improvement being that said second guide tracks comprises curved track sections forming a continuation of said stationary guide tracks and which are supported for limited movement relative to said stationary guide tracks so that the window will be fully moved outwardly when moved to its closed position so as to be substantially flush with the outer flange and outer flange of said frame and said lower body structure, respectively, irrespective of build tolerance variations in the height of the window and the frame.

2. A framed vehicle door assembly as defined in claim 1 wherein said second guide tracks are supported for limited linear movement relative to said stationary guide tracks.

3. A framed vehicle door assembly as defined in claim 1 wherein said second guide tracks are pivotally supported for limited arcuate movement relative to said stationary guide tracks.

4. A framed vehicle door assembly as defined in claim 3 and wherein said second guide tracks are biased by opposed leaf springs to a neutral position, said second guide tracks being pivotally movable in opposition to the biasing force of its adjacently located leaf spring from their neutral position by said guides and with the direction of pivotal movement being dependent on the relative height dimensions of the window and frame within the tolerance variations therefor.

5. A framed vehicle door assembly comprising a lower body structure having spaced inner and outer panels and a pair of spaced end walls which together define a compartment having a top opening extending longitudinally of the door assembly, an upper, generally inverted, U-shaped door frame having fore and aft side portions and a top portion which together with the lower body structure defines a window opening, said frame including a portion which is generally U-shaped in cross-section to define spaced inner and outer flanges and a bottom, a window supported by the lower body structure for movement through the top opening between open and closed positions, first deflectable seal means carried by said portion of said frame and sealingly engageable with said window along its sides on its interior surface and biasing said window outwardly toward engagement with said exterior flange of said portion of said frame, spaced guide channel means including stationary channels supported by said lower body structure and located within said compartment, a pair of guides secured to said window at its opposite sides and adjacent its lower end, said guides being slidably received within said guide channel means, window regulator means carried by said lower body structure and operatively connected with said window for effecting movement of said window between its open and closed positions, second seal means carried by said lower body structure for engagement with said window when in its closed position, and said guide channel means including means for effecting outward movement of said window as it approaches its closed positions so that said window will be substantially flush with said outer flange of said portion of said frame and be substantially flush with the outer panel of said lower door structure when in its closed position, the improvement being that said last named means comprises curved channel sections forming a continuation of said stationary guide channels, said curved channel sections being curved outwardly toward said outer panel of said lower body structure so that the window at its lower end will be moved outwardly when approaching its closed position, said curved channel sections being supported for limited linear movement upwardly from said stationary channels when said guides are received therein until said window at its top engages the bottom of said top portion of said portion of said frame and thereafter pivoting about its top to cause the window at its bottom to be fully moved to its outermost position whereby the window will be substantially flush with the outer flange of said portion of said frame and said lower body structure, respectively, irrespective of build tolerance variations in the height of the window and the frame and irrespective of the build tolerance variations in the seals.

6. A framed vehicle door assembly comprising a lower body structure having spaced inner and outer panels and a pair of spaced end walls which together define a compartment having a top opening extending longitudinally of the door assembly, an upper, generally inverted, U-shaped door frame having fore and aft side portions and a top portion which together with the lower body structure defines a window opening, said frame including a portion which is generally U-shaped in cross-section to define spaced inner and outer flanges and a bottom, a window supported by the lower body structure for movement through the top opening between open and closed positions, first deflectable seal means carried by said portion of said frame and sealingly engageable with said window along its sides on its interior surface and biasing said window outwardly toward engagement with said exterior flange of said portion of said frame, spaced guide channel means including stationary channels supported by said lower body structure and located within said compartment, a pair of guides secured to said window at its opposite sides and adjacent its lower end, said guides being slidably received within said guide channel means, window regulator means carried by said lower body structure and operatively connected with said window for effecting movement of said window between its open and closed positions, second seal means including a deflectable seal carried by said outer panel of said lower body structure for engagement with said window when in its closed position, and said guide channel means including means for effecting outward movement of said window as it approaches its closed positions so that said window will be substantially flush with said outer flange of said portion of said frame and be substantially flush with the outer panel of said lower door structure when in its closed position, the improvement being that said last named means comprises curved channel sections forming a continuation of said stationary guide channels, said curved channel sections being curved outwardly toward said outer panel of said lower body structure so that the window at its lower end will be moved outwardly when approaching its closed position, said curved channel sections being supported by housings located above said stationary channels for limited linear movement toward and from said stationary channels, spring means engageable with said curved sections and said housing for biasing the latter into engagement with said stationary channels, said guides when received within said curved channel sections causing the latter to be moved upwardly in opposition to the biasing force of said spring means until said window at its top engages the bottom of said top portion of said frame whereupon the window will pivot about its top as its bottom is fully moved to its outermost position in the curved guide channels whereby the window will be substantially flush with the outer flange of said portion of said frame and said lower body structure, respectively, irrespective of build tolerance variations in the height of the window and the frame and irrespective of the build tolerance variations in the seals.

7. A framed vehicle door assembly as defined in claim 6 and wherein said spring means comprises a leaf spring having one end integral with said curved channel sections and the other end engageable with a top wall of said housing.

8. A framed vehicle door assembly as defined in claim 6 wherein said guides merely ride in said curved guide channels without causing any upward linear movement thereof when said window is at its maximum height and said frame is at its minimum height, as measured from said lower body structure, but wherein said guides effect upward linear movement of said curved guide channels in opposition to the biasing force of said spring means when the height of the window and frame are other than their maximum and minimum, respectively, with the range of build tolerance variations.

* * * * *